United States Patent
Samra et al.

[11] Patent Number: 5,809,530
[45] Date of Patent: Sep. 15, 1998

[54] METHOD AND APPARATUS FOR PROCESSING MULTIPLE CACHE MISSES USING RELOAD FOLDING AND STORE MERGING

[75] Inventors: Nicholas G. Samra, Plano; Betty Y. Kikuta, Austin, both of Tex.

[73] Assignee: Motorola, Inc., Schaumburg, Ill.

[21] Appl. No.: 558,071

[22] Filed: Nov. 13, 1995

[51] Int. Cl.[6] .................................................. G06F 13/00
[52] U.S. Cl. ........................................ 711/140; 711/119
[58] Field of Search ...................................... 395/446, 467

[56] References Cited

U.S. PATENT DOCUMENTS

| | | | |
|---|---|---|---|
| 4,794,521 | 12/1988 | Ziegler et al. | 395/457 |
| 4,799,199 | 1/1989 | Scales, III et al. | 365/230.08 |
| 4,881,163 | 11/1989 | Thomas et al. | 395/250 |
| 4,910,656 | 3/1990 | Scales, III et al. | 395/471 |
| 5,148,536 | 9/1992 | Witek et al. | 395/467 |
| 5,155,831 | 10/1992 | Emma et al. | 395/448 |
| 5,404,483 | 4/1995 | Stamm et al. | 395/435 X |

*Primary Examiner*—David L. Robertson
*Attorney, Agent, or Firm*—Paul J. Polansky

[57] ABSTRACT

A data processor (40) keeps track of misses to a cache (71) so that multiple misses within the same cache line can be merged or folded at reload time. A load/store unit (60) includes a completed store queue (61) for presenting store requests to the cache (71) in order. If a store request misses in the cache (71), the completed store queue (61) requests the cache line from a lower-level memory system (90) and thereafter inactivates the store request. When a reload cache line is received, the completed store queue (61) compares the reload address to all entries. If at least one address matches the reload address, one entry's data is merged with the cache line prior to storage in the cache (71). Other matching entries become active and are allowed to reaccess the cache (71). A miss queue (80) coupled between the load/store unit (60) and the lower-level memory system (90) implements reload folding to improve efficiency.

16 Claims, 5 Drawing Sheets

METHOD AND APPARATUS FOR PROCESSING MULTIPLE CACHE MISSES USING RELOAD FOLDING AND STORE MERGING

FIELD OF THE INVENTION

This invention relates generally to data processors, and more particularly, to data processors which include caches.

BACKGROUND OF THE INVENTION

A known way to increase the performance of a computer system is to include a local, high speed memory known as a cache. A cache increases system performance because there is a high probability that once the central processing unit (CPU) has accessed a data element at a particular address, its next access will be to an adjacent address. The cache fetches and stores data which is located adjacent to the requested piece of data from a slower, main memory or lower-level cache. In very high performance computer systems, several caches may be placed in a hierarchy. The cache which is closest to the CPU, known as the upper-level or "L1" cache, is the highest level cache in the hierarchy and is generally the fastest. Other, generally slower caches are then placed in descending order in the hierarchy starting with the "L2" cache, etc., until the lowest level cache which is connected to main memory. Note that typically the L1 cache is located on the same integrated circuit as the CPU and the L2 cache is located off-chip. However as time passes it is reasonable to expect that lower-level caches will eventually be combined with the CPU on the same chip.

High performance CPUs typically include several independent execution units in order to perform many operations in parallel. One type of high performance CPU uses a reduced instruction set computer (RISC) architecture. The RISC CPU achieves high performance by having each instruction perform fewer tasks. The independent execution units each perform a specific task and pipeline tasks from several instructions. As a result of these parallel operations the CPU may generate multiple access requests per memory access cycle. The CPU first checks the L1 cache to see if the data is present and if the accessed data is not in the L1 cache, these requests may become misses in the L1 cache and requests to the L2 cache. An arbiter at the input of the L2 cache must arbitrate between multiple requests so that the lower-level memory system is utilized first for the highest priority access.

In order to allow for this internal arbitration and to utilize bus bandwidth most efficiently, some data processors also include queues which allow the results of operations to occur sporadically but which load the bus efficiently. For example, a data processor places a high priority on fetching data which may be required before an arithmetic operation can be completed, but a lower priority on storing the result of a prior arithmetic operation at a destination address in memory. Thus if the data load occurs about the same time as the memory store operation, the data load wins the arbitration and the store operation must wait. Since several store operations may be pending while data fetches are occurring, the store operations are good candidates to be placed in a queue.

Queuing creates the problem that when several accesses are queued, fully executing these accesses in order may result in redundant accesses. For example, assume the data processor is connected to a cache and fetches and stores data directly with this cache. The data is organized in the cache on the basis of cache lines, which may include, for example, eight elements of data each of which corresponds to the data bus width. Every time the data processor requests a data element which is not in the cache, the cache fills an entire line of data. However, if there are several accesses in the store queue to the same cache line, merely performing the store requests in order will result in unnecessary accesses.

In order to overcome this problem known systems perform an operation known as "miss folding". In the miss folding operation the address whose access generated a cache miss is compared with the addresses of all pending cache line fill accesses. If the cache miss access is to the same cache line as a pending cache line fill, then the misses are folded together and processed as a group.

Folding is advantageous for three reasons. First, the group of misses can be processed together with one memory access and thus requires less bus bandwidth. Second, cache misses can be processed faster as a group than individually, and thus more accesses can be retired from the queue faster. Third, the problem of reloading an upper-level cache with the same cache line multiple times is eliminated.

Miss folding is typically done by comparing each upper-level cache miss, either a load or a store, with all outstanding misses in the memory hierarchy. However for memories with deep hierarchies (i.e., many levels of cache), and capable of generating multiple load/store misses per cycle, the hardware to implement this algorithm becomes excessive. Thus, there is a need to achieve the benefits associated with conventional miss folding without all the concomitant costs. This need is met by the present invention, and these and other features and advantages will be more clearly understood from the following detailed description taken in conjunction with the accompanying drawings.

DETAILED DESCRIPTION OF A PREFERRED EMBODIMENT

According to the present invention, a data processor implements two mechanisms which improve the efficiency of the memory system when it encounters multiple cache misses. The first mechanism which is known as "store merging" recognizes the issuance of a store request for data in a cache line which is already the subject of a pending cache line fill. If the store request misses in the cache, it is passed to the lower-level memory system. However information about the store request is preserved in an inactive state until the cache line is received. When the cache receives the cache line from lower levels of the memory hierarchy, critical load data, if any, is first forwarded to the appropriate execution unit. Then store data from the oldest of all inactive store requests to that same cache line is merged into the cache line prior to the cache line being stored in the cache. Other store requests besides the oldest are then allowed to reaccess the cache. Thus, the store may merge when the cache line is received as a result of any access, which may be a prior load access to the same cache line.

The second mechanism is known as "reload folding". The data processor maintains a miss queue between the cache and lower levels of the memory hierarchy. If the load request misses in the cache, it enters the miss queue where the request is passed to the lower-level memory system. The load miss is preserved in the miss queue in an inactive state. When the upper-level cache receives the data of this pending cache line fill in critical-data first format, it first forwards the critical data to the appropriate destination. However, once the data corresponding to the inactive load request is received, the data is forwarded to the appropriate destination before being stored in the upper-level cache. Then the request is removed from the miss queue. In addition to these mechanisms used in the upper levels of the memory hierarchy, the lower levels of the memory hierarchy may use conventional folding techniques.

Figure 1:
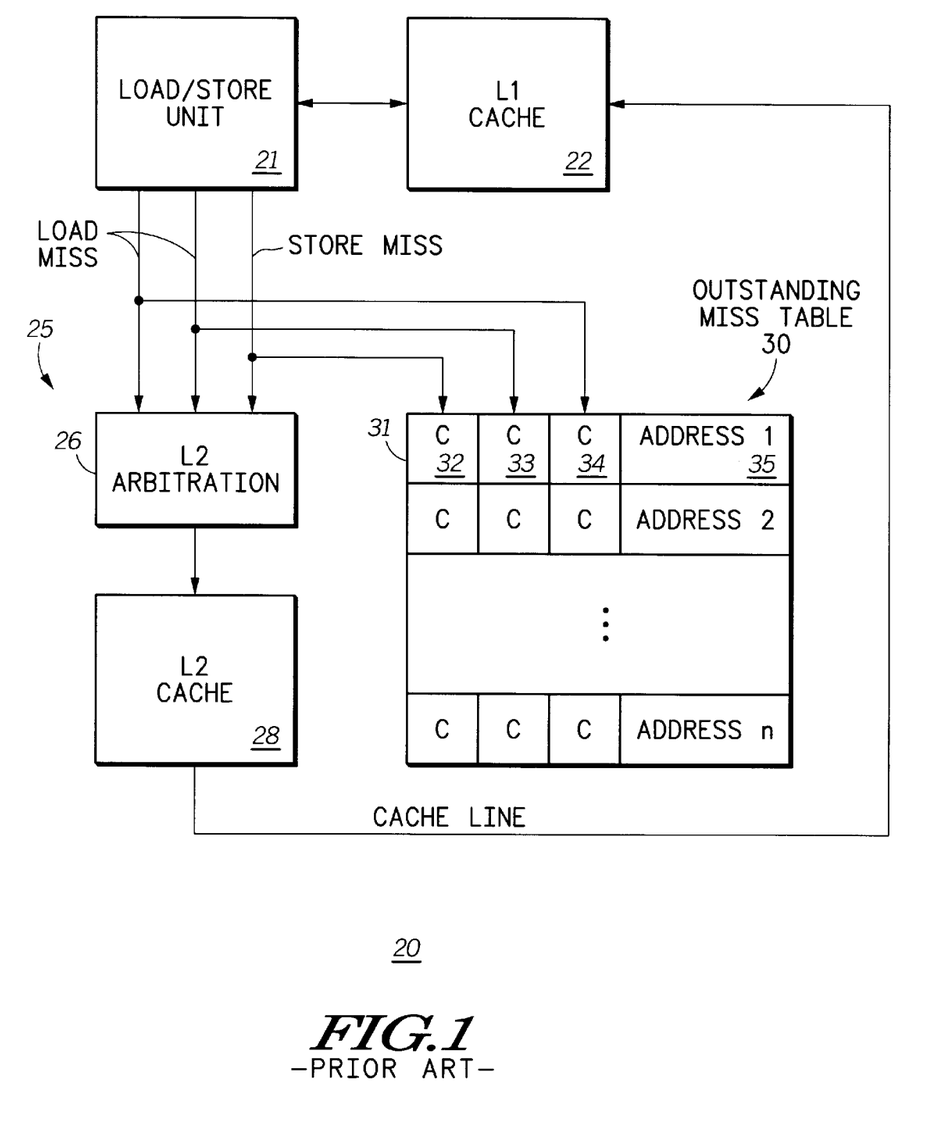
FIG. 1 illustrates in block diagram form a portion of a data processor known in the prior art which processes cache misses using a conventional miss-folding technique.

These mechanisms are understood by first considering FIG. 1, which illustrates in block diagram form a portion of a data processor 20 known in the prior art which processes cache misses using a conventional miss-folding technique. Data processor 20 includes a load/store unit 21, an upper-level ("L1") cache 22, a lower-level memory system 25, and an outstanding miss table 30. Load/store unit 21 generates load and store operations to be performed in response to data processor 20 executing instructions. In response to receiving an instruction, data processor 20 may decode the instruction and forward the decoded instruction to any of a number of destinations, such as independent execution units or register files. Examples of execution units include a floating point unit, an integer unit, a memory management unit, and the like. In addition data processor 20 may have a branch prediction unit which examines instructions in the instruction stream which have yet to be executed, for branch instructions. The branch prediction unit speculatively executes the instructions which would occur if a software branch were taken in order to speed overall program execution. If the branch is later not taken, the branch prediction unit flushes the instructions from the pipeline. These operations are well known in the art. Because it interfaces with multiple independent execution units, load/store unit 21 may receive multiple load and/or store requests at the same time.

L1 cache 22 is a high-speed memory storage area which stores cache lines which are fetched in response to data access requests, and flushed according to a known policy such as least-recently-used (LRU). Thus, if load/store unit 21 is to perform a load operation, it first requests the associated data element from L1 cache 22. If L1 cache 22 stores a cache line having the requested data element, it provides the data element to load/store unit 21 to complete the load access. If however L1 cache 22 does not store this cache line, it signals load/store unit 21 which outputs a cache miss indication to lower-level memory system 25 to begin the cache line fill operation.

Similarly, load/store unit 21 performs store accesses by first trying to store a data element at a particular address in L1 cache 22. If the address is present in L1 cache 22, load/store unit 21 provides the new value for the data element to L1 cache 22. L1 cache 22 subsequently updates lower-level memory system 25 according to the writethru policy being used. In addition, other data processors may monitor or "snoop" the transaction as part of the coherency protocol. If the address is not present in L1 cache 22, however, updating the data element will require a cache line fill from lower-level memory system 25. This "allocate on write" policy means the cache must have a copy of the data before it is written to. L1 cache 22 fetches the cache line at the accessed address from memory system 25 after a store miss instead of just performing a write to lower-level memory. Once the data element has been fetched and stored in L1 cache 22, then the store operation may take place.

In the case of either a load miss or a store miss, L1 cache 22 signals load/store unit 21 and load/store unit 21 activates a miss indication to lower-level memory system 25. The miss indication includes the address of the accessed data element. In order to accommodate a large degree of parallelism, load/store unit 21 is able to activate up to three separate miss indications at once. Two of these indications relate to load cycles and each is labelled "LOAD MISS". A third one of these indications relates to store cycles and is labelled "STORE MISS".

Lower-level memory system 25 includes an L2 arbitration block 26 and an L2 cache 28. L2 arbitration block 26 is important in determining the priority of requests to be serviced when load/store unit 21 presents multiple requests. Since an execution unit may be waiting on the availability of load data before completing an instruction, the LOAD MISS indications are given the higher priority. The STORE MISS is processed only when there are no outstanding LOAD MISSes.

L2 cache 28 stores multiple cache lines of data. If the data element requested in the cycle indicated by L2 arbitration block 26 is present in L2 cache 28, then L2 cache 28 completes the access by providing a cache line to L1 cache 22. If however the requested data element is not present in a cache line of L2 cache 28, then L2 cache 28 initiates a cache line fill request to a next-lower device in the hierarchy, which could be an "L3" cache or main memory. As is known in the art, L2 cache 28 stores the addresses of the cache lines, known as cache tags, in a cache tag array corresponding to the cache line. In addition, there are multiple status bits to indicate the status of the cache line to maintain data coherency throughout the system. One common coherency protocol is known as the "MESI" protocol. Each cache line includes status bits to indicate which MESI state the line is in, including that the cache line has been modified (M), that the cache line is exclusive (E) or shared (S), or that the cache line is invalid (I). However it will become apparent below that the present invention is not limited to caches which implement the MESI protocol.

Before L2 arbitration block 26 arbitrates between accesses to L2 cache 28, outstanding miss table 30 determines whether there is already a pending access to that cache line which can be folded. Outstanding miss table 30 includes n entries, where n is an arbitrary number which may be, for example, 8. Each entry stores an address of a corresponding L1 miss cycle. When an access misses in L1 cache 22, the address which missed is placed into an entry in outstanding miss table 30. Each entry in outstanding miss table 30 also has associated with it three comparators. When an access misses in L1 cache 22, the comparators compare the address of each outstanding L1 cache 22 miss to the new miss. If the new miss to L1 cache 22 matches an outstanding miss currently recorded in outstanding miss table 30, it is "folded" into the previous access and does not result in a new attempted access of L2 cache 28.

For example, a first entry 31 includes a memory location 35 for storing a corresponding address labelled "ADDRESS 1", and three comparators 32–34 each designated by the symbol "C". Comparator 32 compares ADDRESS 1 with STORE MISS; if they comparison matches, then outstanding miss table 30 causes the miss to be folded with the outstanding miss prior to arbitration. Likewise, comparators 33 and 34 compare ADDRESS 1 respectively with the two LOAD MISSes. In a system based on 32-bit addresses, 8-word cache lines, and 32 bits per word, ADDRESS 1 is 27 bits representing the 27 most significant bits of the cache line. Thus, comparators 32–24 are each 27 bits long. If outstanding miss table 30 is eight entries deep, then outstanding miss table 30 requires 648 comparator cells. Thus, a data processor implementing cache miss folding which requires less circuit area is desirable.

Figure 2:
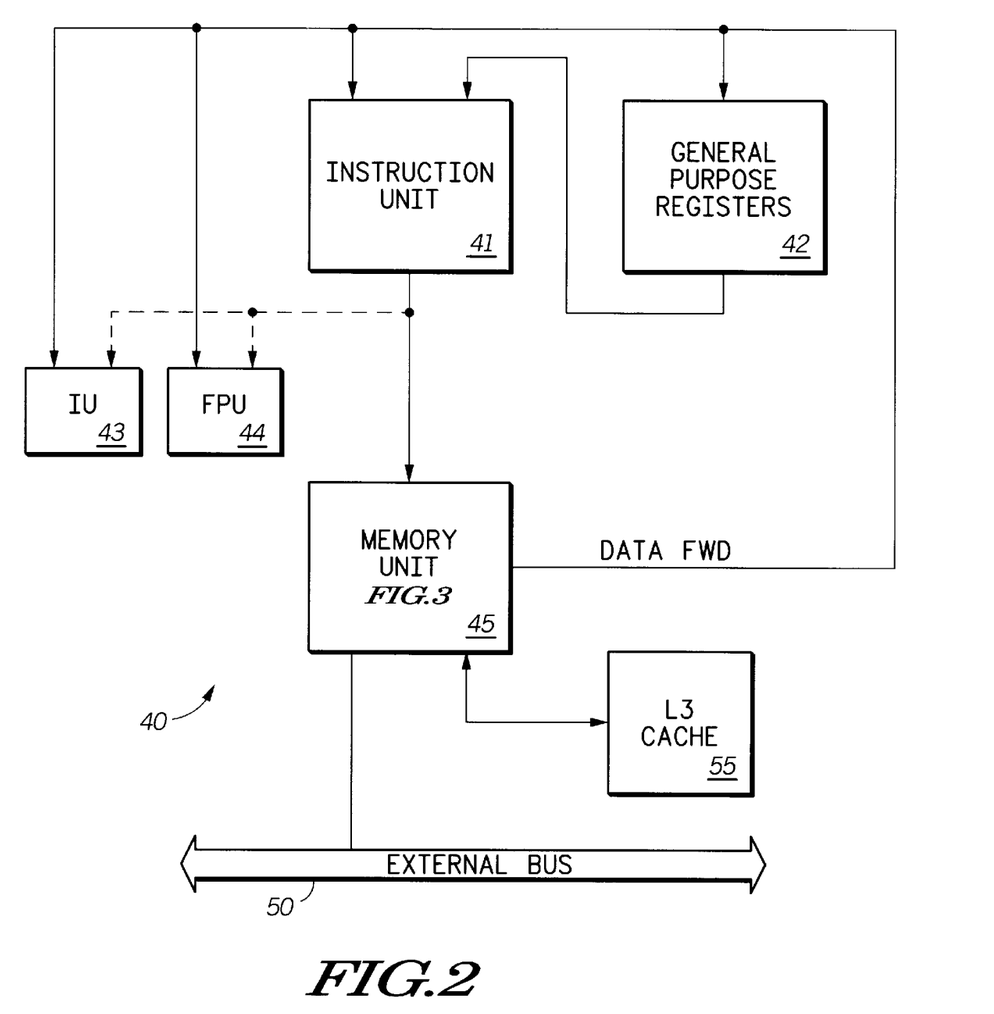
FIG. 2 illustrates in block diagram form a data processor according to the present invention.

FIG. 2 illustrates in block diagram form a data processor 40 according to the present invention. Data processor 40 is an integrated circuit reduced instruction set computer (RISC) data processor which connects to an external bus 50 through a memory unit 45. Data processor 40 also includes a dedicated connection to an L3 cache 55. An instruction unit 41 receives instructions as part of a program. It predecodes and schedules the instructions for dispatch to one of the on-chip execution units. Illustrated in FIG. 2 are an integer unit (IU) 43, a floating point unit (FPU) 44, and a memory unit 45. FIG. 2 shows the connections between instruction unit 41 and IU 43 and FPU 44 as dashed lines to emphasize that the particular type or mix of execution units is not essential to the present invention and may vary from embodiment to embodiment. A set of general purpose registers (GPRs) 42 is also connected to instruction unit 41. Data processor 40 also includes other registers such as a set of floating point registers (FPRs) for use with FPU 44, which are not shown in FIG. 2.

In response to decoding instructions, instruction unit 41 dispatches load and store instructions to memory unit 45. Memory unit 45 includes two levels of on-chip caching. If the accessed data is not present in one of the on-chip caches, however, memory unit 45 will access L3 cache 55 and a lower-level memory subsystem connected to external bus 50. This subsystem may include deeper levels of the cache hierarchy, or just main memory. When it fetches a cache line containing the requested data element, memory unit 45 performs a data forwarding function prior to storing the cache line in the cache. Memory unit 45 has an output labelled "DATA FWD" which is connected to any one of several permissible destinations including instruction unit 41, general purpose registers 42, the FPRs, IU 43, or FPU 44.

Note that data processor 40 may include additional features besides the ones illustrated in FIG. 2. For example, data processor 40 may have a second instruction unit to implement a parallel instruction pipeline. Although not shown in FIG. 2, instruction unit 41 includes a branch prediction unit. Further, memory unit 45 performs memory management by translating logical addresses into physical addresses. It should be appreciated however that these additional features are not related to the present invention and will not be further discussed.

Figure 3:
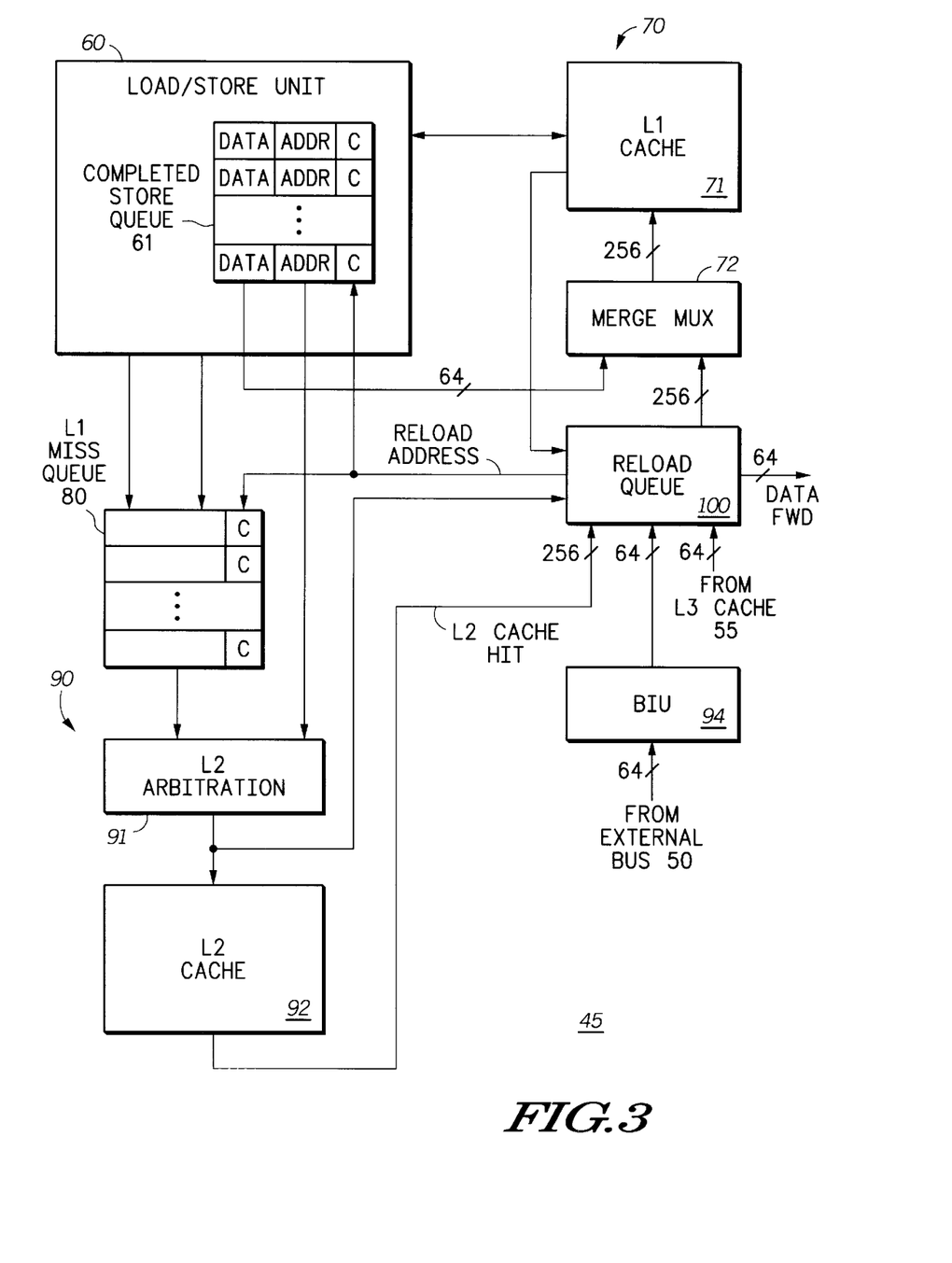
FIG. 3 illustrates in block diagram form the memory unit of FIG. 2.

FIG. 3 illustrates in block diagram form memory unit 45 of FIG. 2. Memory unit 45 includes generally a load/store unit 60, an L1 cache 71, a merge multiplexer (MUX) 72, an L1 miss queue 80, a lower-level memory system 90, and a reload queue 100. Load/store unit 60 has a bidirectional connection to L1 cache 71, two outputs to L1 miss queue 80, an output to lower-level memory system 90, and an input for receiving a value labelled "RELOAD ADDRESS". Load/store unit 60 includes circuitry to execute load and/or store instructions that were dispatched from instruction unit 41 or any other execution unit of data processor 40. Load/store unit 60 also includes a completed store queue 61.

L1 cache 71 is a 4 kilobyte (4KB), direct-mapped, non-blocking cache which stores cache lines fetched in response to data access requests. L1 cache 71 is coupled to load/store unit 60 and also has inputs, not shown, for snooping operations in other caches. L1 cache 71 stores cache tags corresponding to cache lines in a cache tag array. Each cache line is 256 bits, which is equal in size to four double words of 64 bits each. Corresponding to each cache line are status bits including status bits to implement the MESI protocol and to determine the copyback status. L1 cache 71 implements an "allocate on write" policy. According to this policy, if there is an attempt to write a data element of a cache line which is not present, L1 cache 71 must first own a copy of it. L1 cache 71 signals load/store unit 60 to fetch the cache line from memory and then completes the write after the entire cache line has been received and stored in an available entry. Lower levels of memory are subsequently updated according to the cache write-thru policy.

Merge MUX 72 has a first, 64-bit input connected to load/store unit 60, a second, 256-bit input, and a 256-bit output connected to L1 cache 71. Merge MUX 72 also has a control input connected to load/store unit 60, not shown, which controls when and how the 64 bits on the first input are to be merged into the 256-bit output. Merge MUX 72 helps memory unit 45 to implement the store merging function, which will be explained in greater detail below.

Reload queue 100 may receive data from any of three sources and for this purpose has a first, 256-bit data input for receiving a value labelled "L2 CACHE HIT" from L2 cache 92, a second, 64-bit data input connected to BIU 94, and a third, 64-bit data input connected to L3 cache 55. Reload queue 100 also has a first output for providing the RELOAD ADDRESS, a second, 256-bit output connected to the second input of merge MUX 72, and a third, 64-bit output for providing the 64-bit DATA FWD value.

Reload queue 100 is shared between L1 cache 71 and L2 cache 92 and has an input coupled to each cache. Reload queue 100 keeps track of all pending reloads to the corresponding cache, receives and assembles the data from any of the various sources into a cache line, and performs a data forwarding function which will be more fully described below. As data is received reload queue 100 outputs the RELOAD ADDRESS which is then checked against pending L1 stores and loads so that the store merging and reload folding functions may be performed.

While many types of circuits to implement this function will be apparent to those of skill in the art, the one used in reload queue 100 will be described briefly. Reload queue 100 includes generally a reload table and a reload data queue. Reload queue 100 is shared between the L1 and L2 caches and is used to perform both reload folding and store merging for L1 misses as well as conventional folding for the L2 misses. When the access misses L1 cache 71 or L2 cache 92, a reload table pointer allocates one of twelve entries into which the characteristics and status of the cache access are identified. This entry includes a 27-bit cache line address, status bits, and double word valid bits to indicate which if any of the double words forming the cache line have been received. When data corresponding to the cache line is actually received, one of eight entries of the reload data queue is allocated to the entry of the reload table.

L1 miss queue 80 has first and second inputs connected to the first and second outputs of load/store unit 60, a third input for receiving the RELOAD ADDRESS, and first and second outputs. The first and second inputs conduct addresses of load operations which have resulted in misses to L1 cache 71. Each load miss is received and stored in one of four entries of L1 miss queue 80 in an active state. L1 miss queue 80 repeatedly presents the oldest active entry to lower-level memory system 90. After and active entry is presented to lower-level memory system 90, it is placed in an inactivate state. If an entry is inactive, it is not removed from L1 miss queue 80 but remains until the data is forwarded from reload queue 100. For each entry, L1 miss queue 80 includes a corresponding comparator which compares the RELOAD ADDRESS to the address in the entry. If there is a match, then L1 miss queue 80 provides an output, not shown in FIG. 3, to reload queue 100 to indicate the critical data. Reload queue 100 can then provide the critical data to the DATA FWD output. Thereafter L1 miss queue 80 removes the entry.

Lower-level memory system 90 includes an L2 arbitration block 91, an L2 cache 92, and a bus interface unit (BIU) 94. L2 arbitration block 91 has two inputs for receiving access requests from two possible sources. One of these is a load miss which is input from L1 miss queue 80. The second is for a store miss which is output from completed store queue 61. L2 arbitration block 91 implements a policy of allowing the load access to take place first prior to completing the store access. This policy ensures that data which may be needed by an execution unit is fetched first, whereas the results of completed operations are given lower priority.

L2 cache 92 is a 64 KB, eight-way set associative, non-blocking cache which stores cache lines fetched in response to data access requests, and casts out cache lines according to a least-recently-used (LRU) policy. L2 cache 92 stores cache tags corresponding to cache lines in a cache tag array. Like L1 cache 71, each cache line in L2 cache 92 is 256 bits, which is equal in size to four double words of 64 bits each. Corresponding to each cache line are status bits to implement the MESI protocol. If an accesses hits in L2 cache 92, L2 cache 92 provides the 256-bit cache line to reload queue 100. If however the access misses in L2 cache 92, it initiates a cache line fill from lower levels of the memory hierarchy including L3 cache 55 and ultimately from external bus 50.

L1 cache 71 is a data cache associated with load/store unit 60, whereas L2 cache 92 is a combined data/instruction cache which is shared between load/store unit 60 and instruction unit 41. L1 cache 71 and L2 cache 92 store data using a "non-inclusive" protocol, which differs from the conventional "exclusive" and "inclusive" protocols. An exclusive protocol specifies that data is stored in one cache at most. As data is moved into a cache for rapid accessibility it is stored in the cache closest to the data processing core and removed from any lower cache. Exclusive protocol systems have the advantage of high effective storage. In general, the capacity of an exclusive cache is the sum of its parts. However, exclusive caches force a castout operation each time the full L1 cache is loaded with data. Once the L1 cache is full, cache lines must be removed to make space for newer data. A castout operation forces this replaced data to the next lowest cache where another castout operation may be required.

An inclusive protocol specifies that data is initially stored in each cache level in the data processing system when it is loaded from main memory. Inclusive protocol systems have the advantage of simplicity. Since data is loaded into each cache level, replaced data need not be castout to a lower cache level unless the data was modified while it was in the upper level cache. However, the size of an inclusive cache is limited to the size of the largest single cache in the system.

A non-inclusive protocol does not need to castout as much replaced data as an exclusive cache. Instead, a non-inclusive protocol only has to castout modified data or unmodified data that is not in the next lower cache. Since the non-inclusive cache allows multiple copies of the same data within the hierarchical cache, castout data may be already in the next lower cache level. However, it should be apparent that the present invention is applicable to all types of multi-level cache protocols.

BIU 94 is connected to external bus 50 and in response to an L2 cache miss initiates a series of memory access cycles. BIU 94 performs cache line fills by a series of related accesses known as a "burst" cycle. During a burst cycle, the memory is able to provide the pieces of data, known as "beats" of the burst, in rapid succession. Thus the burst cycle increases bus utilization efficiency. BIU 94 performs the burst by fetching the double word with the critical data first. The critical data may be the entire double word or a smaller portion. The critical-data-first policy ensures that during load misses the destination that needs the data will receive it before other double words of the cache line are received. In the illustrated data processing system, external bus 50 is connected to levels of the memory hierarchy below the L3 cache, which may either be an L4 cache or main memory. However, note that the present invention is applicable to any multi-level cache architecture.

In general, load/store unit 60 receives partially decoded instructions dispatched from instruction unit 41 and further decodes them to generate load or store cycles as appropriate. Load/store unit 60 first attempts to access the data in L1 cache 71. If the access hits, meaning that L1 cache 71 contains the cache line which includes the accessed data, then the cycle may be completed between load/store unit 60 and L1 cache 71. If the access misses, meaning that L1 cache 71 does not contain the cache line which includes the accessed data, then the cache line must be fetched from lower levels of the memory hierarchy. This is true for store misses as well as load misses because L1 cache 71 follows an "allocate on write" policy, which means that a write miss causes the cache line to be allocated to the L1 cache. Now the operation of the two cache miss techniques referred to above, store merging and reload folding, will be described in detail.

When it generates a store cycle, load/store unit 60 performs virtual-to-physical address translation and enters the store cycle in a "finished store queue", not shown in FIG. 3. After completing the instruction, load/store unit 60 places the instruction into completed store queue 61. In general, completed store queue 61 has an arbitrary number of entries with each containing certain essential information about the store access including the access address labelled "ADDR" and the store data labelled "DATA". Load/store unit 60 processes the oldest active access by attempting to store the DATA in L1 cache 71. If the access hits in L1 cache 71, the DATA updates the corresponding location in the accessed cache line. L1 cache 71 then updates the lower levels of memory according to the cache writethru policy. If the store misses in L1 cache 71, load/store unit 60 indicates a miss to the L2 cache by providing the store address to the second input of L2 arbitration block 91.

Figure 4:
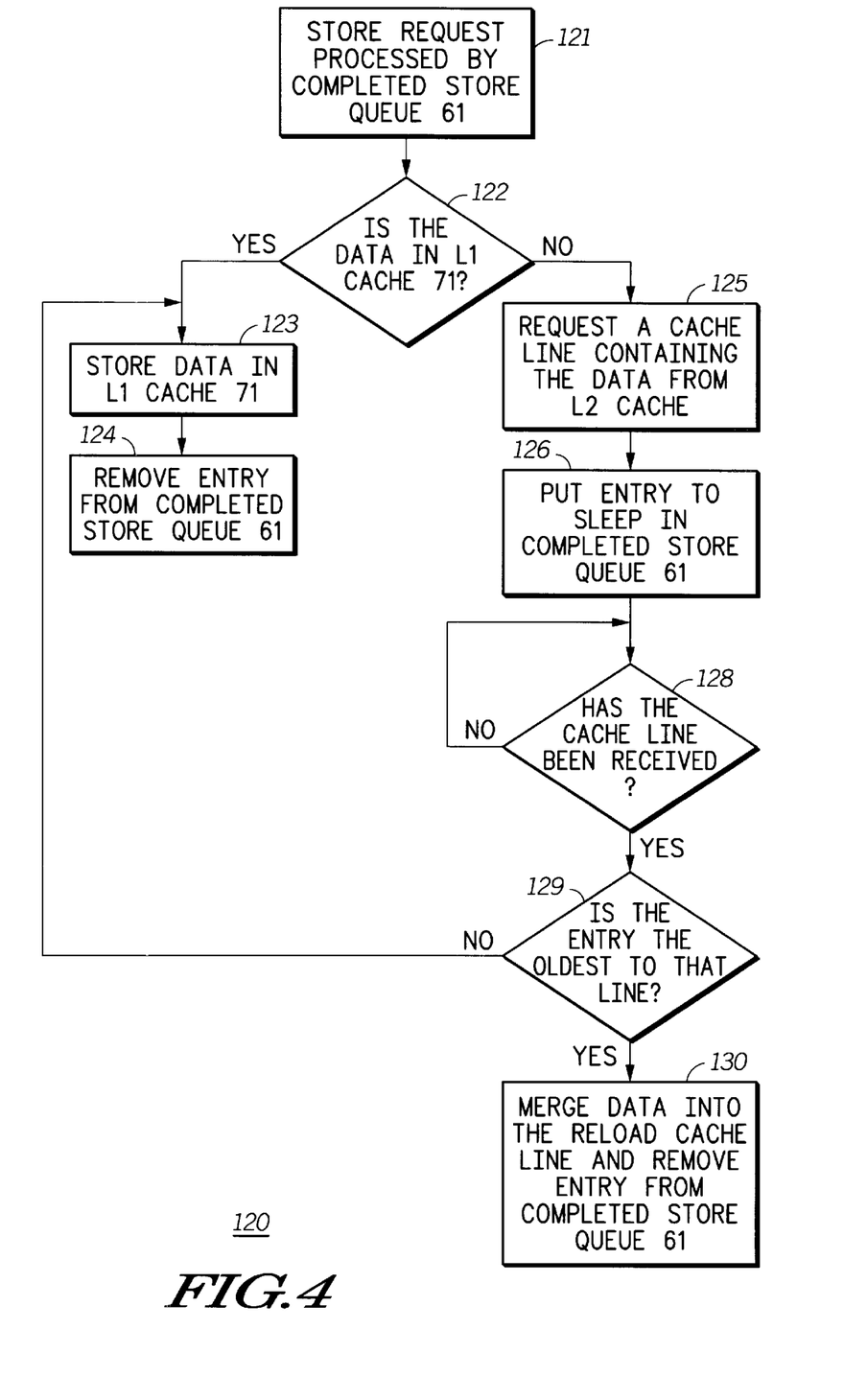
FIG. 4 illustrates a flow chart of the store merging function of the memory unit of FIG. 3.

This operation is better understood with reference to FIG. 4, which illustrates a flow chart 120 of the store merging function of memory unit 45 of FIG. 3. Considering FIG. 4 in conjunction with FIG. 3, at step 121 load/store unit 60 attempts to perform a store request of the oldest active entry in completed store queue 61. If load/store unit 60 determines, at step 122, that L1 cache 71 does in fact store a valid cache line which includes the accessed data element, then load/store unit 60 proceeds to store the data in L1 cache 71 at step 123. Afterward at step 124, load/store unit 60 removes the entry from completed store queue 61.

However if L1 cache 71 does not have a valid cache line corresponding to the store request, then it requests a cache line containing the data from L2 cache 92, through L2 arbitration block 91, at step 125. Load/store unit 60 provides the address of the store miss to the third input of L2 arbitration block 91, which processes the store miss when the load misses have been serviced. The entry is preserved in completed store queue 61 by being put into a "sleep" or inactive state at step 126. The entry remains in completed store queue 61 in the sleep state until at step 128 the associated comparator determines that the cache line has been received. After receiving any cache line, reload queue 100 provides the RELOAD ADDRESS to completed store queue 61. A comparator corresponding to each entry in completed store queue 61 compares the address of the store to the RELOAD ADDRESS. If more than one address matches, at step 129, completed store queue 61 determines which entry is the oldest entry to that cache line. Finally at step 130 completed store queue 61 provides the data element for the oldest matching entry to merge MUX 72, where the data is merged prior to the cache line being stored in L1 cache 71. If there are other entries in completed store queue 61 which match the reload address, these entries are re-activated and thus load/store unit 60 again attempts to perform the store when the entry becomes the oldest active entry of completed store queue 61.

L2 arbitration block 91 selects from among its inputs and generally follows a policy of allowing the load misses to be processed first, and presents the miss that won the arbitration to L2 cache 92. If L2 cache 92 contains the cache line with the accessed data, it completes the request by providing a full cache line to reload queue 100. However if this access misses in L2 cache 92 as well, L2 cache 92 first attempts to access L3 cache 55 via the dedicated bus. If the access misses in L3 cache 55, BIU 94 requests the corresponding cache line from external bus 50. BIU 94 returns the cache line to reload queue 100, sixty-four bits at a time. The access is performed as a burst access on external bus 50 in which a 64-bit segment having the data which caused the access, known as the critical data, is accessed first as taught by Scales in U.S. Pat. No. 4,799,199. Thus, reload queue 100 can forward the critical data to the appropriate unit before BIU 94 retrieves the complete cache line from external bus 50.

Figure 5:
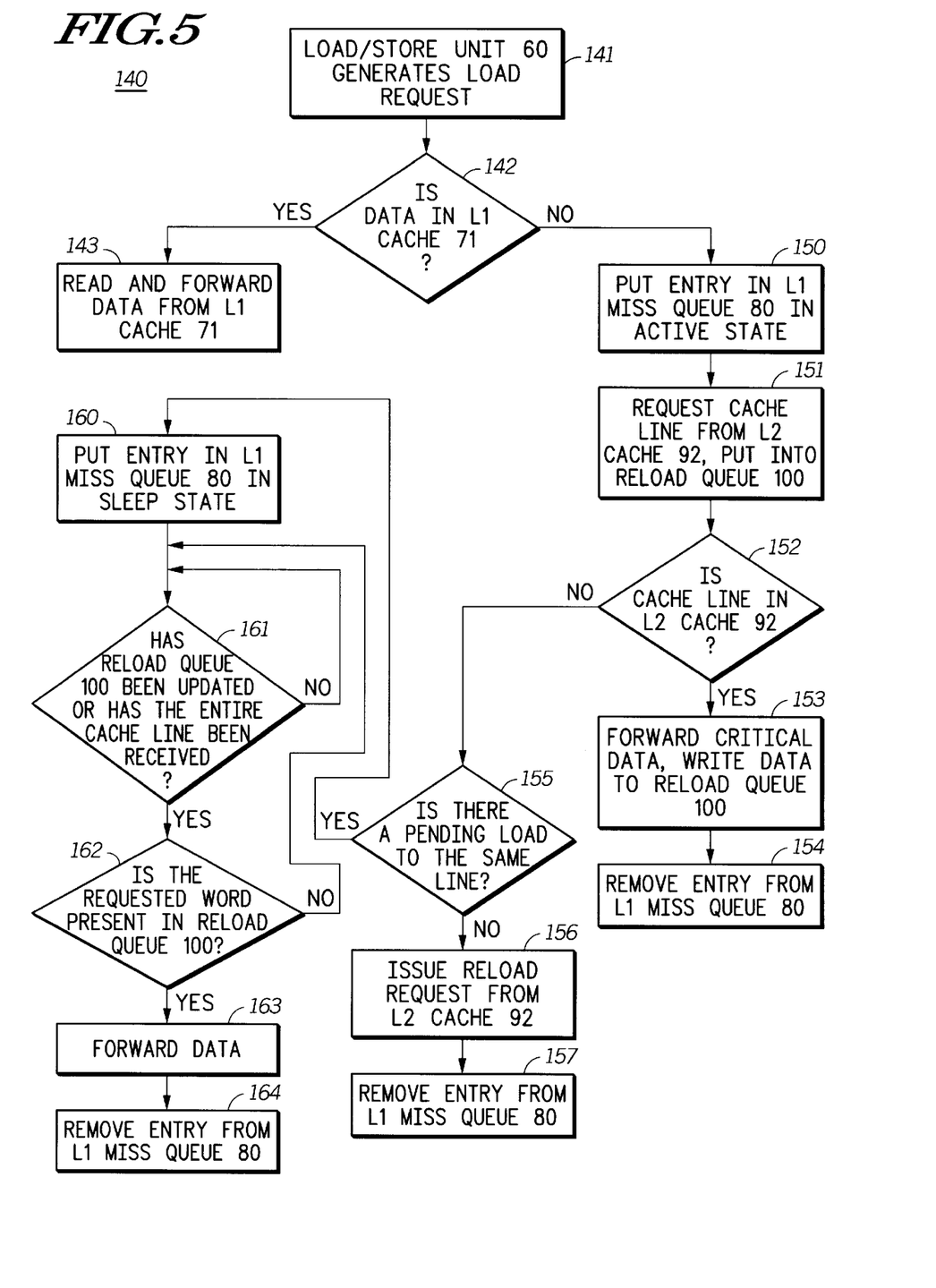
FIG. 5 illustrates a flow chart of the reload folding function of the memory unit of FIG. 3.

Reload folding is better understood with reference to FIG. 5, which illustrates a flow chart 140 of the reload folding function of memory unit 45 of FIG. 3. Considering FIG. 5 in conjunction with FIG. 3, load/store unit 60 generates a load request at step 141. Load/store unit 60 first attempts to access in cache 71 a cache line having the requested data element and determines whether that cache line is present and valid in L1 cache 71 at step 142. If so, at step 143 load/store unit 60 reads the accessed data element and completes the load by forwarding the requested data element to the appropriate destination.

If the load request misses L1 cache 71, it is put into L1 miss queue 80 in an active state at step 150. L1 miss queue 80 is a first-in, first-out queue which presents the oldest active request to L2 arbitration block 91. Thus at step 151 L1 miss queue 80 signals the load request to L2 arbitration block 91, and the load request eventually wins L2 arbitration. Further processing depends on the determination, at step 152, of whether the cache line is present in L2 cache 92.

If the cache line is present in L2 cache 92, then L2 cache 92 provides the entire 256-bit cache line to reload queue 100 which forwards the critical data to the appropriate destination at step 153. Subsequently the entry is removed from L1 miss queue 80 at step 154. However if the access misses in L2 cache 92, then a further determination of whether there is a pending load to the same line is made at step 155. If there is no pending load, then L2 cache 92 issues a line fill request to L3 cache 55 at step 156, and the entry is removed from L1 miss queue 80 at step 157. At this point the load request is assigned to an entry in reload queue 100. If there is a pending load, then the entry is put into the sleep state in L1 miss queue 80 at step 160. There the entry remains, without resulting in a new cache line fill request to lower-level memory system 90, until at step 161 reload queue 100 is updated. This update may take the form of either an additional double word being received from L3 cache 55 or from BIU 94, or the whole cache line being received from L2 cache 92.

Upon receiving an update, reload queue 100 checks whether the double word has been received for each corresponding sleeping entry in reload queue 100 at step 162. If the accessed double word has been received and stored in a reload data buffer, then reload queue 100 forwards the data to the appropriate destination at step 163. Thereafter, the entry is removed from L1 miss queue 80 at step 164. When an entire cache is received, reload queue 100 outputs the RELOAD ADDRESS to L1 miss queue 80. The reload address is compared to each entry in L1 miss queue 80. Each entry that matches is then folded into the reload and removed from L1 miss queue 80.

Note that reload queue 100 follows the critical data first protocol. Thus reload queue 100 first forwards the critical data of the access that caused the cache line fill request by providing it to the appropriate destination on the DATA FWD output. Thereafter other double words are received in a modulo addressing fashion as taught by Scales in U.S. Pat. No. 4,799,199.

By using the store merging and/or reload folding functions, data processor 40 has several advantages over known data processors. First, the amount of hardware required to implement the system is reduced. Data processor 20 of FIG. 1 required that outstanding miss table 30 included three comparators per entry, the number three corresponding to the number of load/store misses that can be generated in one cycle. However data processor 40 only requires one comparator per entry in miss queue 80 as long as cache reloads are limited to one per cycle. Second, store merging improves system performance. Since the store operation is merged directly into the reload, each store merge operation saves a cache access cycle. The stores may merge to any reload, even a reload generated by a load miss. Stores may also merge out-of-order, including stores that have not yet checked L1 cache 71. Finally, since folded loads are processed through the reload queue, a store may merge with the reload cache line and write the cache before data from all prior loads to that cache line have been forwarded from the reload queue. Third, store merging is advantageous when a store miss generates a read-with-intent-to-modify (RWITM) cycle on a multi-processing bus. Conventionally, the BIU must guarantee store protection: the store must commit its data to the cache line that was RWITM before that line may be pushed out to memory by an external snoop. However, store merging automatically commits data during the reload caused by a store miss. This, the BIU need only guarantee that the reload cache line is written to the cache, rather than having to protect that cache line until the store were actually performed to it.

While the invention has been described in the context of a preferred embodiment, it will be apparent to those skilled in the art that the present invention may be modified in numerous ways and may assume many embodiments other than that specifically set out and described above. For example, the present invention is not limited to systems with two- or three-level memory hierarchies. Furthermore, coherency, replacement, and critical-data policies may also vary from embodiment to embodiment. Also, the memory unit may simultaneously present a different number of cache line fill requests to the lower-level memory system than three. Note also that the present invention is not limited to RISC processors. Accordingly, it is intended by the appended claims to cover all modifications of the invention which fall within the true spirit and scope of the invention.

We claim:

1. A method for efficiently processing multiple cache misses in a data processing system having an upper-level cache and a lower-level memory system comprising the steps of:

coupling a miss queue between the upper-level cache and the lower-level memory system;

receiving an indication of a load miss to the upper-level cache;

storing said indication of said load miss in an entry of said miss queue in an active state;

requesting a cache line corresponding to said load miss from said lower-level memory system when said load miss becomes an oldest active request in said miss queue and thereafter placing said entry into an inactive state;

detecting when a data element is received from the lower-level memory system;

determining whether said data element corresponds to said load miss;

forwarding at least a portion of said data element to at least one destination of the data processing system and subsequently removing said entry from said miss queue if said data element corresponds to said load miss; and repeating said steps of detecting, determining, and forwarding if said data element does not correspond to said load miss.

2. The method of claim 1 further comprising the step of performing said steps of requesting, detecting, determining, forwarding, and repeating only if the lower-level memory system already has a pending load to said cache line.

3. The method of claim 2 further comprising the step of issuing a reload request from a second-level cache and removing said entry from said miss queue if the lower-level memory system does not already have a pending load to said cache line.

4. A method for efficiently processing multiple cache misses in a data processing system having an upper-level cache and a lower-level memory system comprising the steps of:

generating a completed store request;

determining whether a cache line associated with a data element of said completed store request is stored in the upper-level cache and if said cache line is not stored in the upper-level cache performing the steps of:

requesting said cache line from the lower-level memory system;

putting said completed store request into an inactive state and while in said inactive state continuing to store said data element;

detecting when the upper-level cache receives said cache line from the lower-level memory system; and merging said data element into said cache line and subsequently storing said cache line in the upper-level cache if said cache line corresponds to said completed store request.

5. The method of claim 4 wherein said step of merging comprises the step of conditionally merging said data element into said cache line only if said completed store request is an oldest one of a plurality of completed store requests associated with said cache line.

6. The method of claim 4 further comprising the step of storing said data element in the upper-level cache if said cache line is stored in the upper-level cache.

7. The method of claim 6 further comprising the step of removing said completed store request from a completed store queue after said step of storing said data element in the upper-level cache.

8. A data processor which efficiently processes multiple cache misses, comprising:

an upper-level cache;

a lower-level memory system;

a load/store unit coupled to said upper-level cache and to said lower-level memory system for generating load/store requests, presenting said load/store requests to said upper-level cache, and presenting cache line fill requests to said lower-level memory system;

said load/store unit including a completed store queue having a plurality of entries each of which includes an address and a data element, wherein said load/store unit presents to said upper-level cache a store request corresponding to each active entry in order;

if said store request hits in said upper-level cache, said load/store unit storing said data element in said upper-level cache and thereafter removing said store request from said completed store queue;

if said store request misses in said upper-level cache, said load/store unit requesting a cache line associated with said store request from said lower-level memory system and thereafter placing said store request into an inactive state; and the data processor further comparing a reload address to said address of said store request when said store request is in said inactive state and merging said data element with said cache line if said reload address matches said address of said store request.

9. The data processor of claim 8 wherein when said upper-level cache (71) receives a cache line from said lower-level memory system and said reload address matches an address of each of at least two entries of said completed store queue, said load/store unit outputs said data element of an oldest one of said at least two entries to said upper-level cache (71) and said upper-level cache (71) merges said data element of said oldest one of said at least two entries with said cache line prior to storage therein, and said completed store queue removes said oldest one of said at least two entries therefrom.

10. The data processor of claim 8 further comprising:

a reload queue coupled to said upper-level cache and to said lower-level memory system having a second plurality of entries for storing addresses corresponding to each pending line fill, and for assembling data elements corresponding to a pending line fill when received and providing an assembled cache line to an output thereof; and a merge multiplexer having a first input for receiving said assembled cache line from said reload queue, a second input coupled to said completed store queue, and an output for providing to said upper-level cache (71) a modified cache line formed when a corresponding data element is merged with said cache line from said reload queue.

11. The data processor of claim 10 wherein said load/store unit, said upper-level cache, and at least a second-level cache of said lower-level memory system are implemented together on a single integrated circuit.

12. The data processor of claim 10 further comprising a miss queue coupled between said load/store unit and said lower-level memory system and having a third plurality of entries each representing an address of a corresponding load request, said miss queue comparing an address of said cache line in said reload queue to said address of each of said third plurality of entries, and when an entry of said third plurality of entries matches said address of said cache line, said miss queue forwarding a corresponding data element to at least one destination of the data processor and removing said entry of said third plurality of entries therefrom.

13. A data processor which efficiently processes multiple cache misses, comprising:

a upper-level cache;

a lower-level memory system;

a miss queue coupled to said lower-level memory system having a plurality of entries each representing an address of a corresponding load miss, said miss queue presenting to said lower-level memory system a cache line fill request corresponding to each active entry in order;

a load/store unit coupled to said upper-level cache and to said miss queue, for generating load/store requests and for either, loading a data element of a load request from said upper-level cache if an address of said load request is present in said upper-level cache, or requesting a cache line associated with said data element from said lower-level memory system and thereafter placing said load request into an inactive state;

said miss queue comparing a reload address of a cache line received by said upper-level cache to said address of each entry and if said address of an entry matches said reload address, said miss queue provides a critical data indication corresponding to said entry to said upper-level cache; and said upper-level cache forwarding a critical data element as determined by said critical data indication to at least one destination of the data processor before storing said cache line therein.

14. The data processor of claim 13 further comprising a reload queue coupled to said upper-level cache and to said lower-level memory system having a second plurality of entries for storing addresses corresponding to each pending line fill, and for assembling data elements corresponding to a pending line fill when received and providing an assembled cache line to an output thereof.

15. The data processor of claim 13 wherein said lower-level memory system includes a second-level cache.

16. The data processor of claim 15 wherein said load/store unit, said upper-level cache (71), and said second-level cache are implemented together on a single integrated circuit.

* * * * *